United States Patent [19]
Stahl et al.

[11] Patent Number: 5,138,650
[45] Date of Patent: Aug. 11, 1992

[54] CORDLESS TELEPHONE WITH INTERNAL DEBIT AND CREDIT MEMORY

[75] Inventors: John I. Stahl, Coral Springs; David L. Brown, Miami; David R. Heeschen, Pompano; Robert L. Breeden, Boynton Beach; Richard E. Bessom, Boca Raton; Frank E. Lambrcht, Hollywood; Mark S. Stuglik, Margate, all of Fla.

[73] Assignee: Motorola, Inc., Schaumburg, Ill.

[21] Appl. No.: 589,467

[22] Filed: Sep. 27, 1990

[51] Int. Cl.$^5$ .............................................. H04M 11/00
[52] U.S. Cl. ........................................ 379/61; 379/91; 379/114; 379/145
[58] Field of Search ................... 379/58, 61, 63, 91, 379/95, 111, 114, 143, 144, 145, 357

[56] References Cited

U.S. PATENT DOCUMENTS

| | | | |
|---|---|---|---|
| 4,776,000 | 10/1988 | Parienti | 379/144 |
| 4,951,308 | 8/1990 | Bishop et al. | 379/144 |

FOREIGN PATENT DOCUMENTS

| | | | |
|---|---|---|---|
| 0117958 | 6/1985 | Japan | 379/58 |
| 0265773 | 10/1989 | Japan | 379/144 |
| 0094862 | 4/1990 | Japan | 379/61 |

OTHER PUBLICATIONS

Advertisement: Anritso, "At Last-A Phone That Won't Nickel and Dime You to Death", Telephony, p. 107, Jan. 16, 1984.

Primary Examiner—James L. Dwyer
Assistant Examiner—Dwayne D. Bost
Attorney, Agent, or Firm—Juliana Agon

[57] ABSTRACT

A method of handling a charge authorization in a cordless phone (12) is provided wherein a memory (53) in the cordless phone (12) is credited (634) by a value representing a purchased amount prior to a usage of the cordless phone (12). The usage of the cordless phone is allowed (420) depending on that value which is debited (522) during the usage of the cordless phone.

31 Claims, 7 Drawing Sheets

CORDLESS TELEPHONE WITH INTERNAL DEBIT AND CREDIT MEMORY

TECHNICAL FIELD

This invention relates generally to an accounting system for a cordless telephone system utilizing radio transmission and specifically relates to connecting the cordless telephone after checking for available credit.

BACKGROUND

In servicing cordless telephone systems, the accounting operation is conventionally done in a subscriber's line switchboard which receives a parent phone line. Present cordless telephone systems operate with private base stations at users' homes, offices or other locations which are connected to a public telephone system. Since each private base station is typically meant to be used only by one subscriber, the accounting operation that will be done in the subscriber's line switchboard would not be too complex.

In addition, since line connection is limited to a predetermined subscriber's line, there is a disadvantage in that it is impossible to move and utilize the telephone set over a broad area. In the next generation of cordless telephones (called CT-2, for cordless telephones, second generation) there will be a plurality of public base stations (also called telepoints) that may be used by any subscriber within range. When in range, a subscriber will be able to access the public switched telephone network (PSTN) and place a call. However, due to the increase in users, the traffic due to the accounting operation for these users in the public telephone network would consequently be multiplied. It is therefore, a desire to minimize the traffic due to increased billing and record keeping done at the public telephone network.

To partially alleviate this increased traffic in a typical CT-2 system, each public base station establishes communications with the CT-2 network control center (NCC) only once every 24 hours for an administrative session. During this session, the base station downloads call detail records of calls handled in the preceding 24 hours and uploads validation/barring data from the NCC. However, some CT-2 service providers do not want to have to wait at least 24 hours before a subscriber can be stopped for exceeding a particular charge limit. The service providers therefore desire a means for limiting the amount of charges that can accrue to a subscriber during a single billing cycle for certain types of calls, most notably, international direct dial (IDD) calls that are the most expensive.

One method for accomplishing a real-time IDD charge limit is to require a real time access to the NCC for permission before allowing the IDD call to go through, for every IDD call placed via the CT-2 base station. In addition, a second access to the NCC is required at the end of each IDD call in order to update the subscriber's IDD charge tally. However, this method of limiting IDD charges can cause a substantial increase in the administrative traffic of the public telephone network. Therefore, there is at least a need to control call charges with a minimum increase in traffic due to the accounting operation in the public telephone network if the billing and record keeping operation at the public telephone network cannot be totally eliminated.

SUMMARY OF THE INVENTION

It is an object of the present invention to provide a cordless telephone system having an accounting function inside the cordless telephone and/or a fixed device in response to credit data for allowing or disallowing a call from that cordless telephone.

Briefly, according to the invention, a method of handling a charge authorization in a cordless phone is provided. A memory in the cordless phone is credited by a value representing a purchased amount prior to a usage of the cordless phone. The usage of the cordless phone is allowed depending on that value which is debited during the usage of the cordless phone.

DETAILED DESCRIPTION OF THE PREFERRED EMBODIMENT

Figure 1:
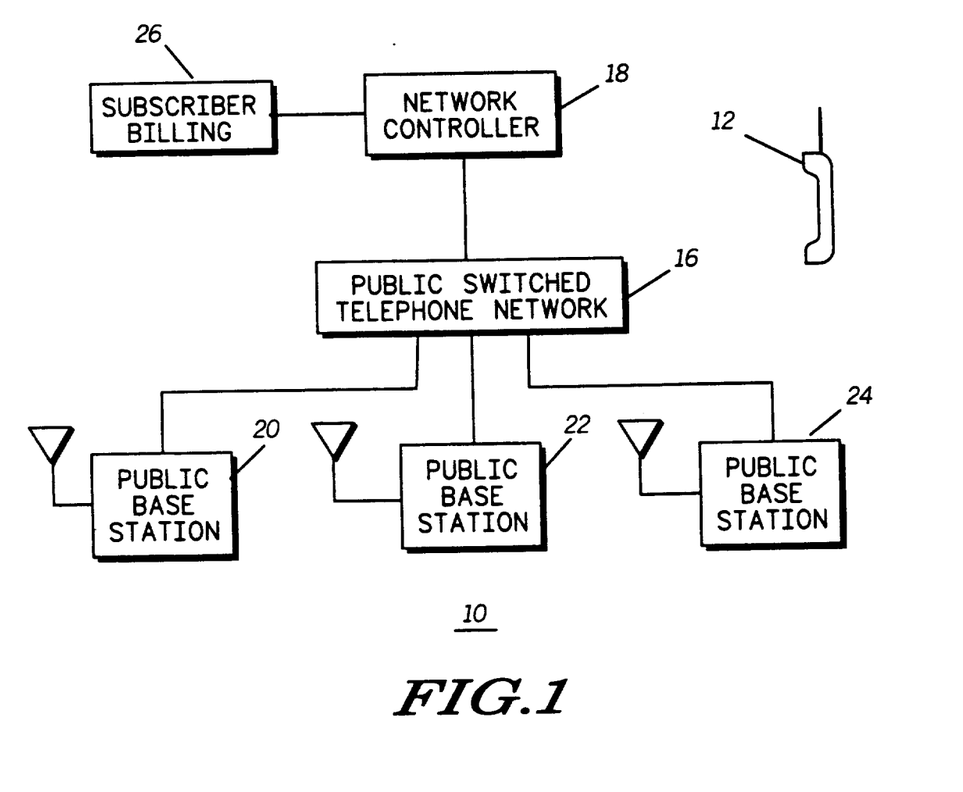
FIG. 1 conceptually shows a cordless telephone network in accordance with the invention.

Referring to FIG. 1, a communication system 10 for providing services to a plurality of subscribers (not shown) comprises a network control center (NCC) or network controller 18, a plurality of public base stations 20, 22, and 24 and a plurality of wireless mobile subscriber units or cordless telephones (represented by a handset 12). The network controller 18 is also connected to a telephone system, for example, a public switched telephone network (PSTN) 16, to allow subscribers to communicate with other telephone users. The present invention can work with any type of telephone system or network such as a public system (PSTN) or a private system. Private systems include a key system, a private branch exchange (PBX), or a private automated branch exchange (PABX).

Each subscriber can communicate with the network controller 18 via the network of public base stations 20, 22, and 24. In this system, a voice connection is established by RF transmission from the cordless telephone handset 12 via the public base station or fixed device 20, 22, or 24 by the PSTN 16 to a telephone set not shown (which may be far away as in an international dialed call but accessible by the public switched telephone network 16).

The network controller 18 is connected to a subscriber billing block 26 which includes meter means for calculating and recording an account corresponding to an amount of callings of the cordless telephone handset 12. The billing block 26 can credit a subscriber's account when the subscriber pre-purchases a call by cash or credit card, in person, via a telephone line or via RF transmission. As calls are made, the billing block 26 automatically decrements or debits the subscriber's account. Depending on the software sophistication of the public base station (20, 22, 24) and/or the cordless handset 12, according to the invention, the functions inside the subscriber billing block 26 may be reduced.

Figure 2:
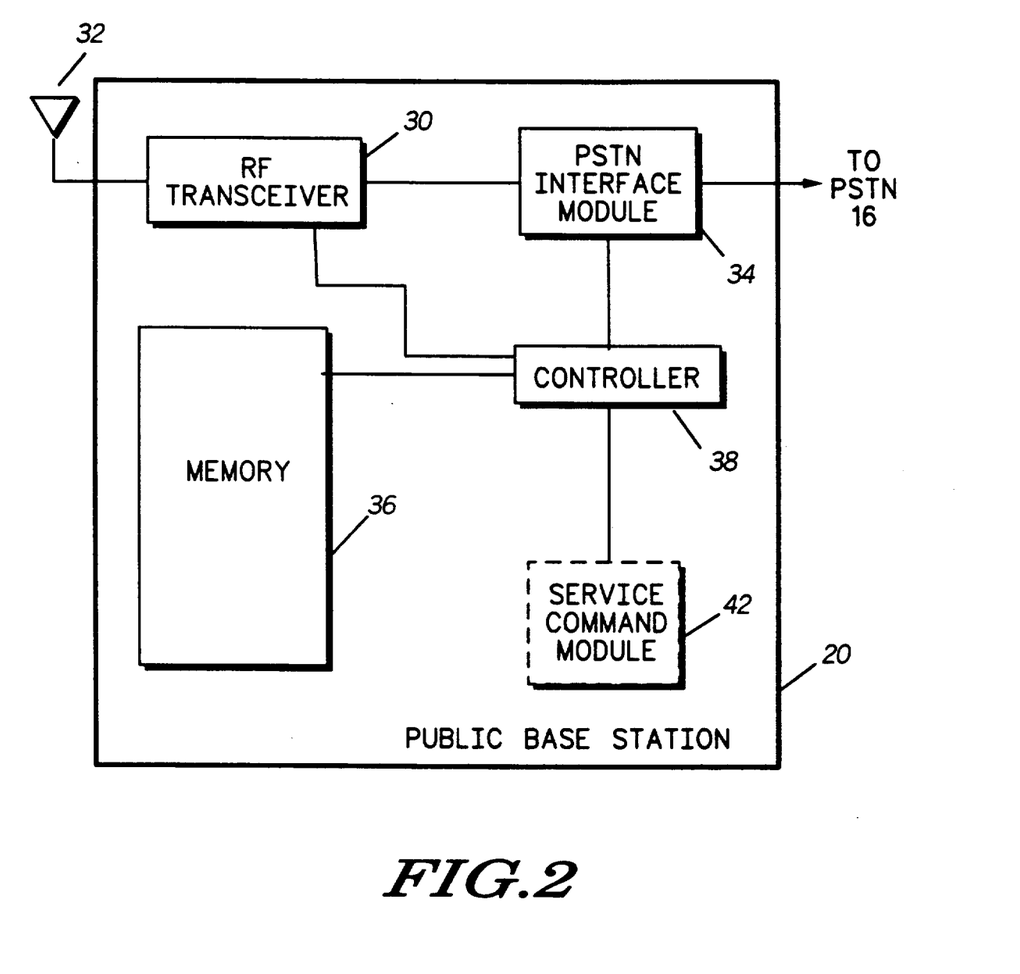
FIG. 2 shows a basic block diagram of a public cordless telephone base station in accordance with the invention.

Referring to FIG. 2, a public base station (or wireless phone booth) 20 in accordance with the invention is shown in block diagram form. Each of the components of the wireless phone booth 20 represented by a block is conventional. An antenna 32 is coupled to an RF transceiver 30. The base station also includes a memory 36 for storing information including memory templates containing information relating to subscribers (such as account, status, or rate information) and a controller 38 (e.g., a conventional microprocessor) for processing the information stored in the memory 36. A part of the memory 36 may also provide call authentication and verification statistic functions. An optional service command module 42 processes requests for services and informs the network controller 18 as to what services are required. A PSTN interface module 34 provides an interface with the public switched telephone network 16.

The base station 20 thus enables a subscriber to acquire access to any of the information and services available through the network controller 18 of FIG. 1. Moreover, since the base station 20 has its own memory, the memory templates relating to a subscriber may be transferred to it by the network controller 18, thus allowing the base station 20 to provide the requested services and/or information to the requesting subscriber without a continuous coupling to the network controller 18.

In operation (see FIG. 1), the base station 20, 22, or 24 performs connection control based upon account information (such as available credit) received from the handset 12. The base station 20, 22 or 24 further performs accounting control by setting and then transmitting an accounting factor (such as a rate, a decrementing algorithm, or an actual updated available credit value) to the handset 12. The call statistics based on the numbers dialed are located within the memory 36 for use in calculating the accounting factor.

Figure 3:
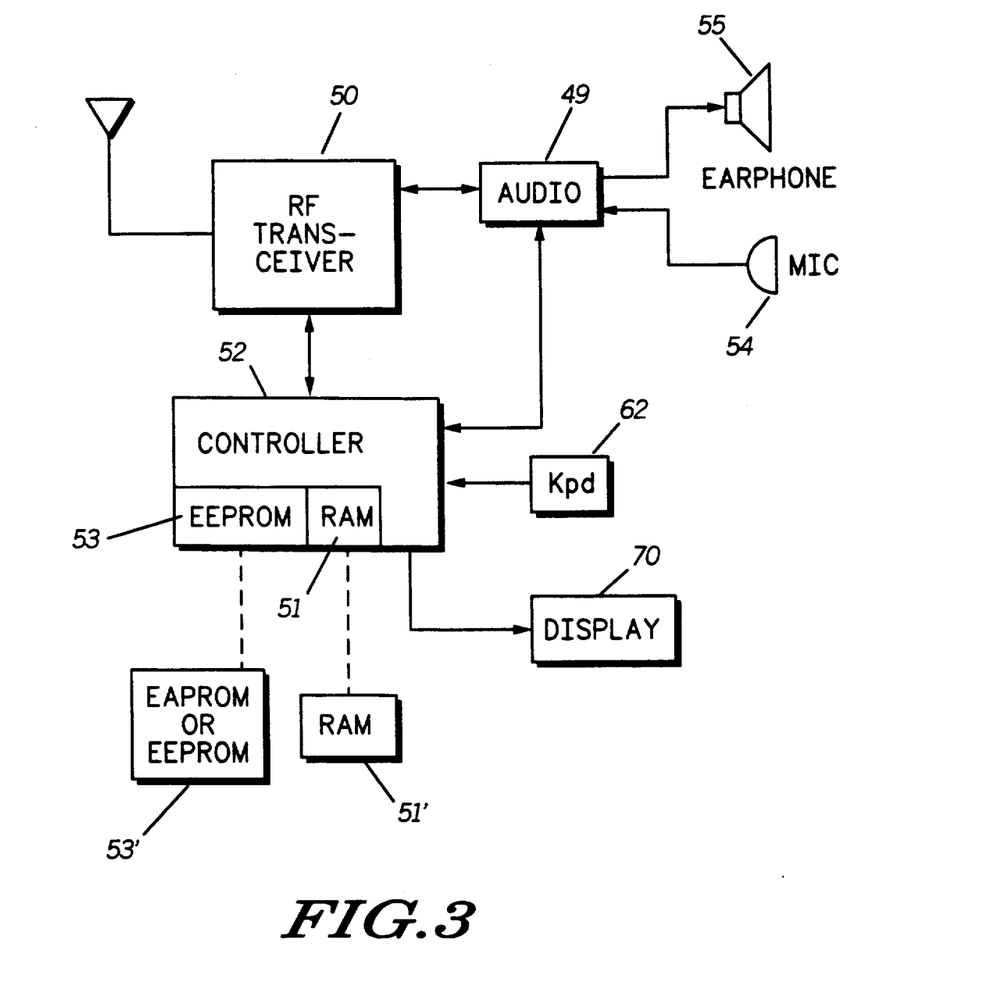
FIG. 3 shows a block diagram of a cordless telephone in accordance with the invention.

Referring to FIG. 3, a cordless handset 12 in accordance with the invention is shown. The cordless telephone handset (or wireless mobile subscriber unit) 12 comprises a conventional radio transceiver 50 which may operate as a means for requesting information from the memory 36 in the base station 20 (or alternatively in the network controller 18). For example, the handset 12 may request and obtain credit over the air from the network controller 18 via the base station 20 after transmitting a request or dialing a number.

The cordless telephone handset 12 further comprises an audio section 49 connected to an earphone 55 and a microphone 54. A plurality of accessory modules allow the cordless telephone handset 12 to gain access to more credit and/or account information. A keypad 62 thus allows the user to type commands or information to the public base station 20 such as dialing a number to request more credit. A display 70 may provide the user with credit information such as the subscriber's credit limit, the last phone number dialed or whether the phone line is connected to allow the call. The controller 52 performs the accounting control.

As the mastermind of the handset 12, a controller 52 includes a non-volatile memory EEPROM (or EAPROM) 53 and a RAM 51. Additional EEPROMs (or EAPROMs) 53' and/or RAMs 51' may be used depending on cost and size constraints. The controller 52 allows the subscriber to load information received from a base station 20 into either the EEPROM 53 or RAM 51 and process it. The processed information then may be sent externally to the base station 20 or the network controller 18, or moved internally to the EEPROM 53. Inside the non-volatile memory EEPROM 53, may be stored the subscriber's account or credit value, the subscriber unit ID number and other system operation parameters. The ID information contained in the EEPROM 53 includes the subscriber's number and/or the handset serial number. Having these numbers may enable tracking of a stolen handset by the base station which would have a list of stolen handsets. If more than one subscriber uses the same cordless handset 12, multiple accounts associated with each subscriber's personal ID may also be stored in one or more of the EEPROMs 53 and 53'.

The non-volatile memory EEPROM 53 has account information stored in it which is downloaded via the base station 20 and recorded by the conventional accounting means and meter means in the network controller 18 whenever credit is requested and allowed. The non-volatile memory EEPROM 53, inside the handset 12, is used to maintain the stored account balance, even when the power is turned off. The account memory in the cordless telephone handset 12 residing in the EEPROM 53 can be rewritten in a manner shown as in FIGS. 5, 7, or 9. As sufficient credit is available, the system counts down the value in the account memory inside the EEPROM 53 each time a call is made in a manner shown as in FIG. 4. For example, the account memory in EEPROM 53 is rewritten with a particular credit value or account value which will be reduced by an adequate amount depending on the rate charged for the particular call. When a predetermined value in the account memory located inside the EEPROM 53 becomes insufficient for a call to be made, the connection of the call to the PSTN 16 is not made by the public base station 20. However, a request for rewriting the account memory inside the EEPROM 53, can be connected to the network controller 18 via the public base station 20, even when the account is insufficient or a negative balance may be accrued for a limited time or amount such that the current call can be connected.

Accordingly, the present invention is a method and apparatus by which an expensive call such as an international direct dialing (IDD) call may have its charges controlled. Other calls may also be controlled similarly to eliminate the billing and recordkeeping associated with those calls at the network controller. As only one example of a type of calls to be controlled, an international direct dialing (IDD) call may be effectively controlled by means of a single NCC (18) access per day from each handset 12 utilizing the non-volatile electrically alterable memory EAPROM 53 of the handset 12. This memory (53) is used in the handset 12 to store supplementary IDD data which are used to prevent excessive IDD charge accruals during the time period between the normally scheduled administrative sessions between the base stations 20, 22, and 24 and the network controller NCC 18. Every base station 20, 22, 24 in the system will begin its "fiscal day" at a pre-programmed time late enough to be sure that the last of the daily base-to-NCC (20-to-18) administrative sessions has been completed.

Figure 4:
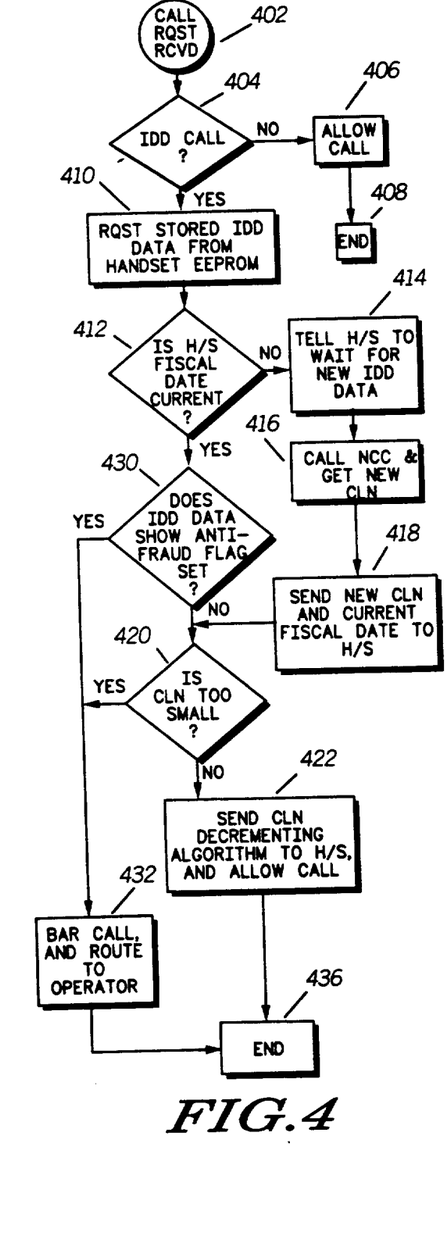
FIG. 4 is a flow-chart for the operation of a base station in accordance with a first embodiment of the present invention.
Figure 5:
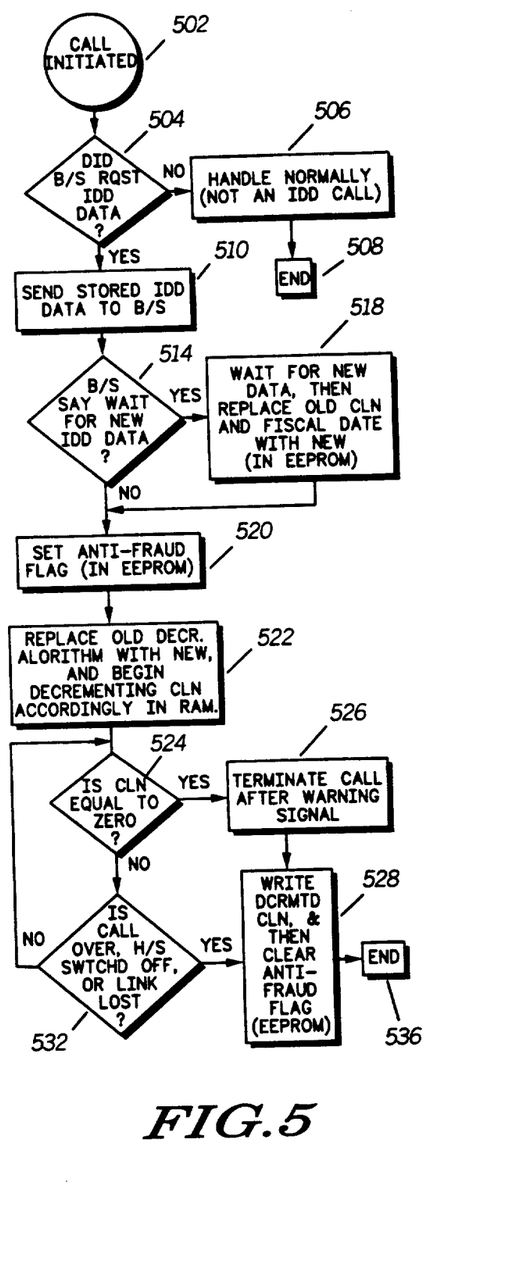
FIG. 5 is a flow chart for the operation of a hand-set in accordance with a first embodiment of the present invention.

Referring to FIGS. 4 and 5, the operation of the base station 20 and the handset are illustrated together in a first embodiment of the present invention. The operation of the base station 20 and the handset 12 will be described together since the steps in FIG. 4 are reciprocal of those in FIG. 5. Referring to FIG. 4, after each new "fiscal day" begins, the first IDD call placed by each handset 12 will cause the base station 20 handling the call to access the NCC 18 for permission to allow the call. A call initiated in step 502 of FIG. 5 is received as a call request in step 402 of FIG. 4.

A decision block 404 determines whether the call is an IDD call. If the call is not an IDD call, it is allowed (406) and the routine ends in block 408. Accordingly, the base station 20 will not request stored IDD data from the handset's EEPROM 53 in step 410, as determined by the decision block 504 of FIG. 5 and the non-IDD call will be handled normally in step 506 before ending the routine in step 508. If the call is an IDD call (404), the base station 20 will request stored IDD data from the handset's EEPROM 53 in step 410. Accordingly, since IDD data were requested as determined by decision block 504, the handset 12 will send the stored IDD data to the base station 20 in step 510.

Proceeding with the IDD call procedure, a decision block 412 determines whether the handset 12 has a current fiscal date as part of the stored IDD data. The base station 20 will recognize the IDD call as the first one on that "fiscal day" for the handset 12 because the fiscal date, stored in the handset's non-volatile memory EEPROM 53 during the first IDD call by the handset on an earlier date will be different from the current fiscal date contained in the base station 20. If the handset's fiscal date is not current, the base station 20 will tell the handset 12 to wait for new IDD data in step 414. If the base station in step 414 commanded the handset to wait for new IDD data, as determined by a decision block 514, the handset 12 will wait for the new data in step 518.

Meanwhile, the base station 20 will call the NCC 18 and obtain a new credit value or charge limit number (CLN) in step 416. Before granting permission for the call to be connected, the NCC 18 will download to the base station 20 a current charge limit number (CLN) roughly representing the maximum amount of additional IDD call charges which will be allowed to handset 12 as of the current fiscal date. In step 418, the base station 20 will then send the new CLN and the current fiscal date to the handset 12 which will store them in the non-volatile memory EEPROM 53 in place of the old data in step 518 of FIG. 5.

After having the current CLN and fiscal date in its IDD data, the handset 12 will set an anti-fraud flag in its non-volatile memory EEPROM 53 in step 520. Since the new CLN has not been used yet, it's value will not be too small as determined by a decision block 420 in FIG. 4. The base station 20 will then send a decrementing algorithm in step 422 to the handset 12 which will be received and replaced in step 522 in the handset's RAM 51. This decrementing algorithm will program an appropriate rate by which the handset 12 will decrement the CLN for this call now allowed to be connected. The decrementing algorithm in step 422, may include the phone number to be called to determine the rate, a personal ID number, or pin, to authorize the call, and the value of the CLN, along with a method to calculate the time and date to form a record. Throughout the remainder of the call, the handset 12 will continuously decrement the CLN (in its RAM at the specified rate). In this manner, the time the routine takes to traverse the loop from steps 524 to 532 and back again, as often as needed, would provide an indication of the duration of the call. Based upon a particular rate, this time information will enable the charge for the call to be calculated by the decrementing algorithm for debiting the value of the CLN.

After each decrement, the handset 12 will check whether the CLN is equal to zero in decision block 524. The call will be terminated in step 526 (after giving an audible warning beforehand via the earphone 55, a visual warning in the display 70, or other indications) if the CLN should reach zero as determined by the decision block 524. At the end of the IDD call, the handset 12 will move the decremented CLN from its RAM 51 to its non volatile-memory EEPROM 53 after which it will clear the previously set anti-fraud flag in step 528.

From then on whenever the handset 12 attempts to place an IDD call, in step 502, the base station 20 will command the handset 12 in step 410 to send to the base station 20 the stored IDD data (fiscal date, CLN and anti-fraud flag status). If the base station 20 determines that the handset's fiscal date is equal to the current fiscal date in step 412, the anti-fraud flag to be clear in decision block 430 and the CLN is large enough in step 420 to allow the call, then the base station 20 will send a new decrementing algorithm to the handset 12 in step 422. Only then will the base station 20 permit the call with no need for the base station 20 to access the NCC 18.

The anti-fraud flag is used to prevent any additional IDD calls on the same day that an IDD call has already been made but the handset 12 did not complete the desired sequence of moving the decremented CLN to its non-volatile memory EEPROM 53 at the end of the call. This scenario may only occur as a result of a handset power loss (battery removal long enough to disable the handset controller 52) during an IDD call. For if the handset had been switched off, or the link is lost before the call is over as determined by a decision block 532, the decremented CLN would still be moved to the non-volatile memory EEPROM 53 and the anti-fraud flag cleared in step 528 before ending the routine in block 536. Hence, the current credit available will always be debited due to a call processed before the routine ends.

However, if during a subsequent IDD call attempt, the base station 20 discovers (in decision block 430) from the IDD data that the handset's anti-fraud flag is still set, and that the stored fiscal date is the current fiscal date in decision block 412, the base station 20 will disallow the IDD call in step 432 and route it to an operator before ending the routine in block 436. Since the anti-fraud flag is still set, the handset's CLN must be assumed to be invalid. Of course, if the handset's fiscal date is not the current fiscal date, then the call will be allowed as the first IDD call of the current fiscal day as described previously, since by then, all NCC call charge records for the subscriber would have been updated during an earlier daily administrative session. Thus, without the use of the anti-fraud flag, an unscrupulous user could terminate each IDD call by removing the battery from the handset thus preventing hte decremented CLN from replacing the original CLN in the handset's non-volatile memory EEPROM 53. In this manner, the unscrupulous user could place an unlimited amount of IDD calls in a single day before detection during a subsequent base-to-NCC administrative session.

In step 524 instead of determining whether the CLN is equal to zero, another threshold higher than zero can be used to give the user additional time to purchase more credit by giving a warning beforehand. The base station 20 could warn the user that the value or amount of credit in the cordless telephone handset 12 is reaching a minimum threshold level by audible voice in the earphone 55 or words on the display 70.

If, instead of a positive number, a negative threshold is used in the decision block 524, a negative balance higher than the negative threshold would still enable the user to continue the call. However, a negative balance at the beginning of the call would inhibit selected handset operations. The negative balance approach allows the user to complete a phone call just as if there was sufficient credit in the CLN for the call. As the call progresses, the value of the CLN would approach zero, and as the call continues, the charge based on a time and rate information would then be accumulated as a negative value in the decrementing algorithm. When the call is terminated, the user would then be notified that he or she cannot make any more calls until the user calls into the system and requests more credit as in steps starting from 416 (or 718 of FIG. 7 in more detail).

A second method which is a modification to the use of the anti-fraud flag would be to decrement the CLN directly in the handset's EEPROM 53 during each IDD call. However, because of the excessive number of writes to the EEPROM 53, the EEPROM 53 might become worn out (at an earlier date). Should EEPROM technology advance to the point that such devices could handle a large enough number of write operations, this alternative method might become preferred.

Generally, since the current Common Air Interface (CAI) specification for CT-2 does not provide a means of requesting or sending the IDD data and CLN decrementing algorithms required to implement the invention, additional control codes and message formates from the CT-2 Standard Control Authority body will first have to be administratively obtained before the present invention can be implemented in a CT-2 system. Then the rate information or other pertinent information may be added in a field of the Common Air Interface CAI. In addition, all credit data exchanges between base stations and handsets should be encrypted for greater security.

While the preceding description of the present invention has concentrated on it's use to control IDD call charges in a CT-2 system, this invention is not limited to either IDD charges or CT-2 systems. The present invention is broadly applicable to any type of communication system using centralized administration and billing and any type of usage sensitive charges which an operator may want to limit without having to access the central controller 18 for each and every call beginning and end.

Accordingly, the method of FIGS. 4 and 5 describes a first embodiment whereby a decrement algorithm is sent over the communications link between a base station 20 and a subscriber handset 12 in order to determine the rate of debiting the credit available in the handset 12. This first embodiment of the present invention may require greater memory and computing power in the handset 12 than it is capable of handling at the present time (additional EEPROMs 53' and/or RAM 51' may not be available). Two alternative embodiments are therefore described in FIGS. 6 through 9.

Figures 6, 7:
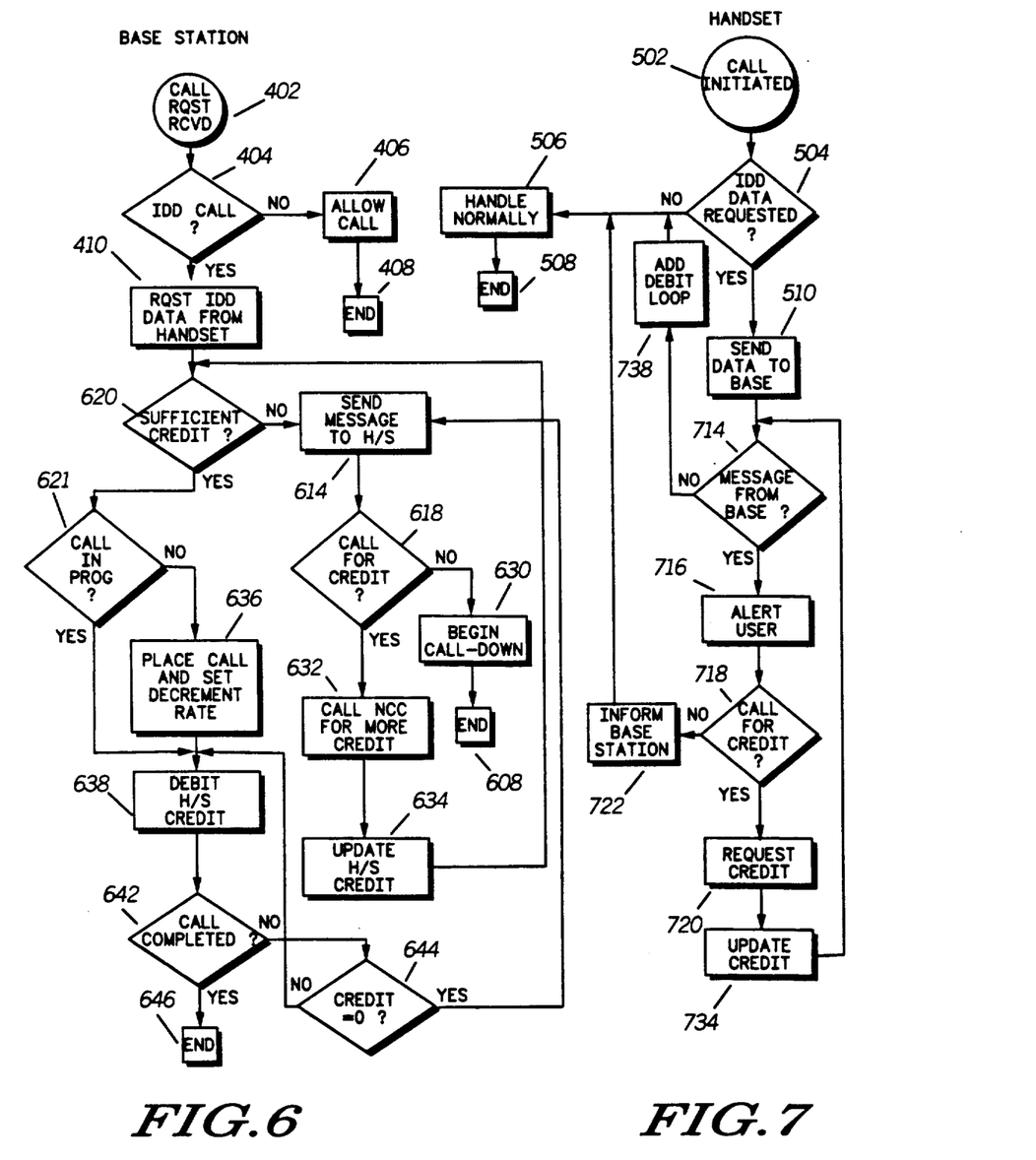
FIG. 6 is a flow-chart for the operation of a base station in accordance with a second embodiment of the present invention.
FIG. 7 is a flow chart for the operation of a hand-set in accordance with a second embodiment of the present invention.

Referring to FIGS. 6 and 7, a second embodiment of the present invention is illustrated in flow diagram form showing the modifications to FIGS. 4 and 5 for the base station 20 and the handset 12, respectively. The steps similar to those of FIGS. 4 and 5 are identically labelled as such and need not be further commented upon. The base station 20 verifies that the handset 12 is authorized (e.g., the handset is not stolen and has sufficient credit) to place IDD calls at the time it requests IDD data from the handset 12 in step 410. If IDD calls are authorized and the handset 12 does not have enough credit as determined by a decision block 620, the base station 20 will send a message to the handset 12 (in step 614) which will be received (in step 714) to alert the user (in step 716) of insufficient credit.

The user can then request more credit in step 720 or not as determined by the decision block 718. If credit is not requested, the base station 20 will be informed in step 722 and the handset 12 will handle the call-down normally in step 506, before ending the session in step 508. The request for credit of step 720 sent by the handset 12 is received by the base station 20 to determine in decision block 618 as to whether a call for credit has occurred. If no credit was requested, the call-down procedure of step 630 is processed before ending the session in block 608.

On the other hand, if more credit was requested, the base station 20 will call the NCC 18 for more credit in step 632. Based upon permission by the NCC 18, the base station 20 transmits the updated credit to the handset 12 in step 634, which is received by the handset 12 in step 734.

When there is enough credit, the base station 20, as determined by the decision block 620, will initialize the credit decrementing process since the call has not already been in progress (621) by placing the call and setting the decrement rate in step 636. The base station 20 will also debit the handset's credit in steps 638 and 738 at the appropriately determined intervals as determined by the decision blocks 642 and 644, where the credit is checked (644) before the call is completed (642) and ended in block 646. In this manner, the handset 12 only needs to remember in step 738 the amount of credit sent to it by the base station 20 in step 638 before the termination of the call (either normally or accidentally). In block 508, the handset 12 would have already retained the new value of the current charge limit number CLN as the last credit update which has been decremented and placed that decremented value into the EEPROM 53 in step 738 or at the termination of the call.

Figure 8:
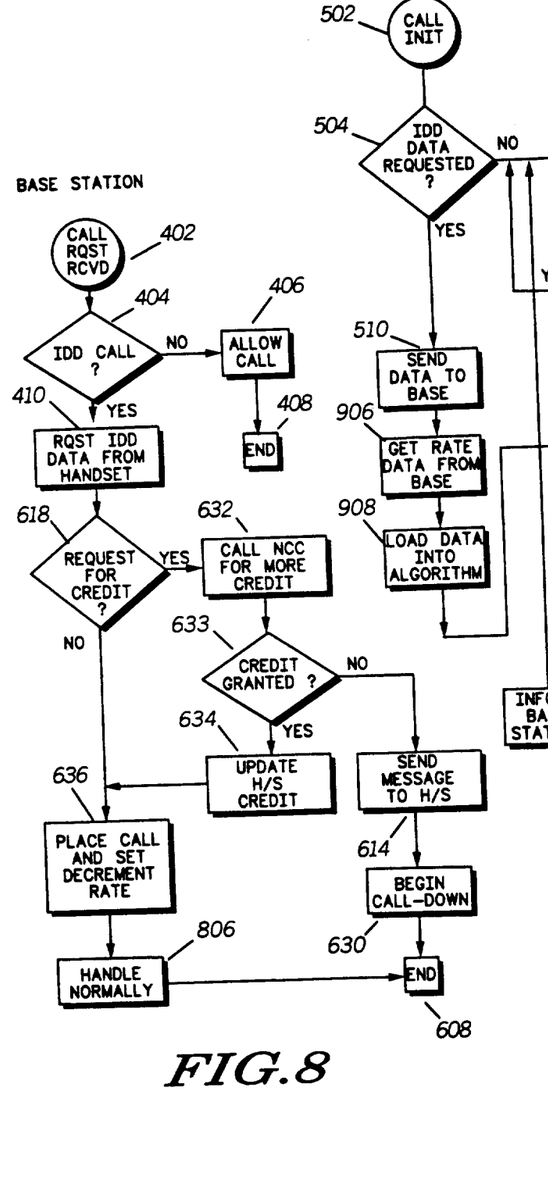
FIG. 8 is a flow-chart for the operation of a base station in accordance with a third embodiment of the present invention.
Figure 9:
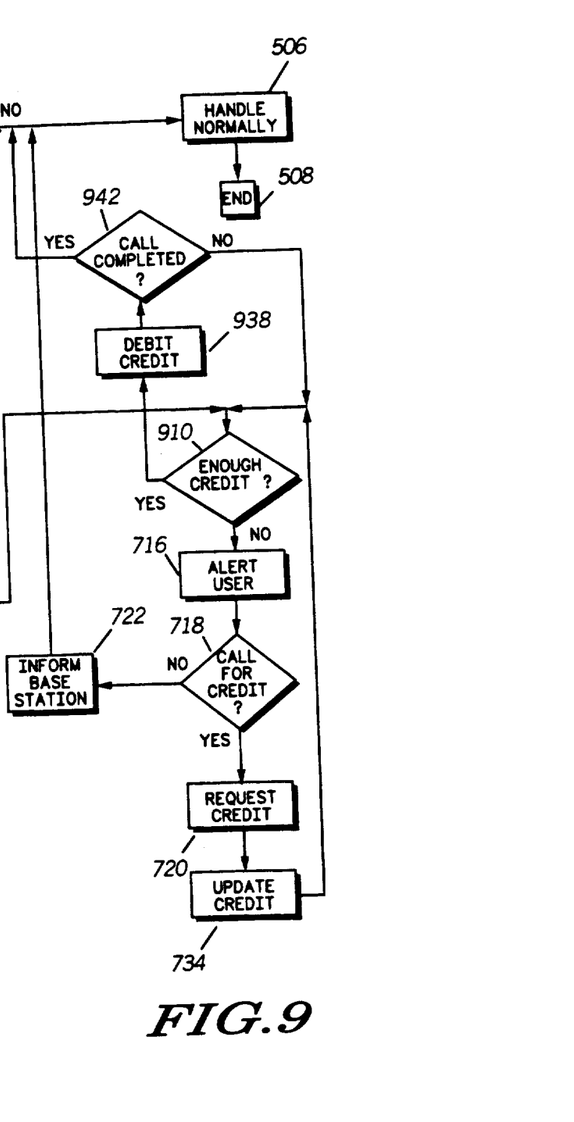
FIG. 9 is a flow chart for the operation of a hand-set in accordance with a third embodiment of the present invention.

Referring to FIGS. 8 and 9 the operation of the base station 20 and the handset 12 are illustrated for a third embodiment of the present invention showing mainly the modifications to FIGS. 4 and 5. As previously described, the identical steps are labelled identically and need not be further commented upon. With the advent of a handset controller with more memory capacity, the decrement algorithm may be integrated into the software of the handset 12 and a decrement rate could be sent to the handset 12 by the base station 20 as a normal handling procedure in step 636 and received by the handset 12 in step 906.

After receiving the decrement rate in step 906 and loading the rate data into the algorithm (908) to determine whether credit is sufficient in a decision block 910, the handset 12 will itself determine the need for more credit and proceed along the previously described credit requesting steps if necessary.

If credit is granted after requested (720), as determined by a decision block 633 in the base station 20 by the NCC 18, the base station 20 will update the handset's credit in step 634 as previously described. Otherwise, if credit was not requested even though it was insufficient, as previously described, a message will be sent from the base station 20 to the handset 12 in step 614 to begin a call down procedure in step 630 before ending the session at block 608.

If the handset 12 determines (910) there is sufficient credit, that credit will be continuously debited (938) according to the rate loaded already in the decrementing algorithm and checked for sufficient credit (910) throughout the duration (942) of the call. The handset 12 will thus implement the commencement (908) and termination (942) of the decrementing process itself but would be still under the control (636 and 630) of the base station 20.

As can be seen, the flow charts of FIGS. 4 through 9 are only examples of possible implementations. The steps within these flow charts can be interchanged, modified, combined or deleted to create more variations as desired. If the methods of record keeping, crediting, and debiting are sophisticated enough (e.g., service provider information may be included in the CAI) normal billing procedures from the service provider may even be eliminated if desired and many billings could be pre-purchased and debited according to the invention.

As one variation, in step 718 of FIG. 7, when credit is requested, the user or subscriber could call in to the CT-2 operator, using the subscriber's cordless telephone handset 12 and purchase a quantity of air time, using a credit card or against the user's own account. The CT-2 operator would then address the CLN within the handset 12 and update the CLN value with the new authorized amount in step 634 of FIG. 6.

Figure 10:
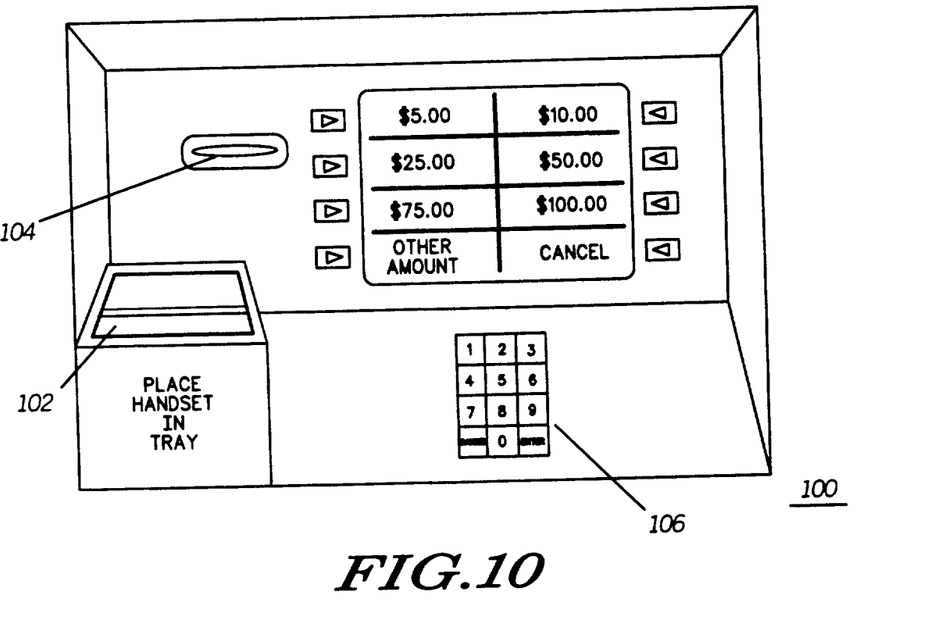
FIG. 10 is a conception of a CT-2 credit vending machine in accordance with the invention.

Referring to FIG. 10, an alternative to an operator granting credit is illustrated in the form of a CT-2 credit vending machine 100. This credit vending machine can be installed in high use traffic areas, such as train stations, shopping centers. A user could place his or her cordless telephone handset in the machine (102), deposit some amount of money or insert a credit card (104), punch (106) in the subscriber's radio user ID and receive credit by the updated CLN information loaded into the handset by the credit vending machine 100. The vending machine 100 can verify the radio's ID with the subscriber's ID and load in the deposited amount via the credit card or cash purchase.

Of course, the vending machine concept can also be implemented at the base station 20. The network controller 18 may even have direct access to credit card companies, allowing a user to call into the system and charge calls through to the account directly. The caller could then directly transfer funds from the credit card account to the cordless telephone handset's CLN. In this manner, the billing and record keeping required for the public cordless telephone system may be reduced.

In summary, system costs can be reduced by having either the base station or the cordless telephone operate the accounting function. Since the decrementing process of the charge limit number is continuously processed during a call, there would be a minimum loss of revenue by the service provider, by not handling the accounting function in the network controller, while reducing the complexity and traffic of the network controller.

What is claimed is:

1. A cordless phone system for handling a charge authorization, comprising:
a base station comprises:
   means for providing to a cordless phone a credit balance prior to a usage of said cordless phone,
   means for receiving from said cordless phone said credit balance stored therein,
   connection means for allowing said usage of said cordless phone depending on said credit balance,
   said connection means comprising:
      means for transmitting to said cordless phone a request signal requesting account data including said credit balance,
      means for preventing a call to initiate in case of failure to receive said account data from said cordless phone, and
      means for determining whether said credit balance is sufficient for the type of call to be initiated based on the phone number dialed prior to a usage of said cordless phone to make said call, and
   means for providing debiting information to said cordless phone; and
said cordless phone comprises:
   memory means for storing said credit balance,
   means for transmitting to said base station said account data including said credit balance stored therein in response to said request signal,
   crediting means for crediting said credit balance when more credit is granted, and
   debiting means for debiting said credit balance for said usage of said cordless phone in response to said debiting information to update said credit balance.

2. A cordless telephone system, for communication with a telephone network, comprising:
   a base station connected to said telephone network;
   a cordless telephone coupled to said base station via radio;
   said cordless telephone including an account memory;
   said base station including control means for allowing a call from said cordless telephone depending on when said account information in said account memory of said cordless telephone exceeds a predetermined value and when an anti-fraud flag is cleared;
   means for providing debiting information from said base station for updating said account memory corresponding to said call from said cordless telephone;
   means for setting said anti-fraud flag before reducing said account information;

means for reducing said account in said account memory in dependence on said call to provide replenished account information;

means for clearing said anti-fraud flag after reducing said account information; and means for storing an amount of said replenished account information.

3. A method of handling a charge authorization in a wireless communication system, comprising the steps of:

transmitting to a cordless phone a request signal requesting account data in response to a call request by the cordless phone;

disallowing initiation of a call in case of failure to receive said account data from said cordless phone;

determining a credit balance in a memory of said cordless phone based on said account data received prior to a usage of said cordless phone to make said call; and allowing said usage of said cordless phone depending on said credit balance.

4. The method of claim 3 wherein said determining step comprises:

determining when said account data exceeds a value calculated to be sufficient for the type of call to be initiated based on the phone number dialed.

5. A method for limiting a call charge accrual in a cordless telephone system, comprising the steps of:

in a base station:
determining when a call request from a cordless telephone has been received, transmitting to said cordless phone a request signal for requesting stored account information from said cordless telephone, preventing initiation of a call in case of failure to receive said stored account information from said cordless telephone, processing said stored account information to determine if sufficient credit associated with said cordless telephone is available in order to connect said call request, placing a call, based on said call request, and setting a decrement rate for reducing said credit based on said call, and transmitting decrement information to said cordless telephone; and in said cordless telephone:
transmitting said call request to said base station, transmitting said stored information in response to said request signal, and receiving said decrement information.

6. The method of claim 5 wherein said receiving said decrement information step comprises receiving a decrementing algorithm in a field of the CT-2 Common Air Interface (CAI) to reduce said credit associated with said cordless telephone.

7. The method of claim 5 wherein said receiving step comprises receiving a reduced credit to replace said credit associated with said cordless telephone.

8. The method of claim 5 wherein said receiving step comprises receiving said decrementing rate to reduce said credit associated with said cordless telephone.

9. The method of claim 5 wherein said processing step comprises determining if said stored account information indicates sufficient credit associated with said cordless telephone is available to initiate the type of call to be made based on the phone number dialed.

10. A cordless telephone system, for communication with a telephone network, comprising:

a base station connected to said telephone network;

a cordless telephone coupled to said base station via radio;

said cordless telephone including an account memory;

said base station including control means for allowing a call from said cordless telephone depending on when account information in said account memory of said cordless telephone exceeds a predetermined value;

means for providing debiting information from said base station for updating said account memory corresponding to said call from said cordless telephone;

means for setting an anti-fraud flag before reducing said account information;

means for reducing said account in said account memory in dependence on said call to provide replenished account information;

means for clearing an anti-fraud flag after reducing said account information; and means for storing an amount of said replenished account information.

11. The cordless telephone system of claim 10 wherein said account data comprises a date representation.

12. The cordless telephone system of claim 11 wherein said control means comprises means for disallowing said call from said cordless telephone when said date representation is not current.

13. A cordless phone system for handling a charge authorization, comprising:

memory means for storing a credit balance prior to a usage of said cordless phone;

updating means for updating said credit balance; and connection means for allowing said usage of said cordless phone depending on said credit balance;

said connection means comprising:
means for transmitting to a cordless phone a request signal requesting account data;

means for disallowing initiation of a call in case of failure to receive said account data from said cordless phone; and means for determining whether said credit balance in said memory means is acceptable for the type of call to be initiated based on the phone number dialed prior to a usage of said cordless phone to make said call.

14. The cordless phone system of claim 13 wherein said memory means for storing said credit balance is included in said cordless phone.

15. The cordless phone system of claim 13 further comprising inhibiting means to limit predetermined functions of said cordless phone but still allowing the current call to continue when said credit balance is less than a predetermined value.

16. The cordless phone system of claim 13 wherein said updating means comprises:

crediting means for crediting said balance when more credit is granted; and debiting means for debiting said balance for said usage of said cordless phone.

17. The cordless phone system of claim 16 wherein said debiting means is responsive to charge information for debiting said balance to provide a negative balance representation.

18. The cordless phone system of claim 15 wherein said debiting means is included in said cordless phone.

19. The cordless phone system of claim 18 further comprising:
   rate factoring means is included in a base station coupled to said cordless phone via radio frequency transmission to provide rate information for debiting said balance in said cordless phone;
   transmitting means in said base station for transmitting said rate information to said cordless phone; and
   charge conversion means in said cordless phone for converting said rate information into debit information for said debiting means.

20. The cordless phone system of claim 16 wherein said debiting means is included in a base station coupled to said cordless phone via radio frequency transmission.

21. The cordless phone system of claim 20, wherein said memory means for storing said credit balance is included in said base station.

22. The cordless phone system of claim 21 further comprising transmitting means for transmitting said credit balance from said base station to said cordless phone.

23. A cordless telephone system for communication with a telephone wired network, comprising:
   a base station connected to said telephone wired network;
   a cordless telephone coupled to said base station via radio;
   said cordless telephone including an account memory and account data wherein said account data further comprising account information;
   said base station comprising means for transmitting to said cordless telephone a request signal requesting account data;
   said cordless telephone comprising means for transmitting said account data to said base station in response to said request signal;
   said base station comprises means for not allowing a call to initiate in case of failure to receive said account data from said cordless telephone;
   said base station including control means for allowing said call from said cordless telephone depending on when said account information in said account memory of said cordless telephone exceeds a predetermined value;
   means for providing debiting information from said base station for updating said account memory corresponding to said call from said cordless telephone;
   means for reducing said account in said account memory in dependence on said call to provide replenished account information; and
   means for storing an amount of said replenished account information.

24. The cordless telephone system of claim 23 further comprising in said cordless telephone, means for determining when said account information in said account memory exceeds said predetermined value calculated to be sufficient for the type of call to be initiated based on the phone number dialed.

25. The cordless telephone system of claim 23 wherein said account data comprises a date representation.

26. The cordless telephone system of claim 25 further comprising determining means in said base station for determining whether said date representation is current.

27. The cordless telephone system of claim 25 wherein said control means comprises means for disallowing said call from said cordless telephone when said date representation is not current.

28. The cordless telephone system of claim 25 wherein said control means comprises means for transmitting to said cordless telephone a current date when said date representation received is not current.

29. The cordless telephone system of claim 28 further comprising means in said cordless telephone for storing said current date received as said date representation.

30. The cordless telephone system of claim 25 further comprising:
   means in said base station for transmitting to said cordless telephone a current charge limit when said date representation received is not current; and
   means in said cordless telephone for storing said current charge limit received as said credit balance.

31. The cordless telephone system of claim 30 wherein said current charge limit is a rough estimation of a maximum amount of daily call charges.

* * * * *